United States Patent [19]

Shu

[11] Patent Number: 4,606,407

[45] Date of Patent: Aug. 19, 1986

[54] PROGRAMMED GELATION OF POLYMERS FOR OIL RESERVOIR PERMEABILITY CONTROL

[75] Inventor: Paul Shu, Princeton Junction, N.J.

[73] Assignee: Mobil Oil Corporation, New York, N.Y.

[21] Appl. No.: 676,376

[22] Filed: Nov. 29, 1984

[51] Int. Cl.$^4$ ............................................. E21B 33/138
[52] U.S. Cl. ..................... 166/270; 166/274; 166/275
[58] Field of Search ................... 166/270, 274, 275; 252/8.55 D

[56] References Cited

U.S. PATENT DOCUMENTS

| | | | |
|---|---|---|---|
| 3,208,518 | 9/1965 | Patton | 166/9 |
| 3,749,172 | 7/1973 | Hessert et al. | 166/274 |
| 3,981,363 | 9/1976 | Gall | 166/270 |
| 4,040,484 | 8/1977 | Hessert | 166/270 X |
| 4,488,601 | 12/1984 | Hammett | 166/270 |
| 4,574,887 | 3/1986 | Abdo | |

Primary Examiner—Stephen J. Novosad
Assistant Examiner—Thomas J. Odas
Attorney, Agent, or Firm—Alexander J. McKillop; Michael G. Gilman; Stanislaus Aksman

[57] ABSTRACT

Polymers used for the control of permeability in stratified subterranean formations are gelled in a controlled manner by the use of rapid and delayed gelling agents. The polymer is first gelled lightly by the use of a rapid gelling agent which partly cross-links the polymer to produce a viscous solution which will selectively enter only the more permeable regions of the formation but can still be readily injected. A delayed cross-linking agent completes the cross-linking process after the polymer has been selectively emplaced to form a firm, full strength gel. Suitable rapid cross-linking agents may be formed by the reaction of alkalies and chromic salts at specified ratios or by the redox reduction of chromium from its higher oxidation states under certain specified conditions. Delayed cross-linking agents are exemplified by chromic salts. Polymers which may be used include polyacrylamides and polysaccharide biopolymers.

33 Claims, No Drawings

PROGRAMMED GELATION OF POLYMERS FOR OIL RESERVOIR PERMEABILITY CONTROL

FIELD OF THE INVENTION

This invention relates to the use of polymers for the control of permeability in subterranean oil-bearing formations and more particularly, to a method for controlling the speed with which the polymers gel in order to control the permeability of the oil-bearing formation or reservoir more effectively.

BACKGROUND OF THE INVENTION

In the production of oil from subterranean oil reservoirs by various flooding techniques, especially waterflooding, it has become a common expedient to add various polymeric thickening agents to the water in order to increase its viscosity to a point where it approaches that of the crude oil which is to be displaced so as to improve the displacement of the oil from the reservoir. Use of polymers for this purpose is often stated to be for mobility control.

Another problem which arises in the various flooding processes is that different strata or zones in the reservoir often possess different permeabilities so that displacing fluids enter the high permeability of "thief" zones in preference to zones of lower permeability where significant quantities of oil may be left unless measures are taken to plug the high permeability zones wholly or partly and so divert the displacing fluid into the low permeability zones. Mechanical isolation of the thief zones has been tried but vertical communication among reservoir strata often renders such measures ineffective. Physical plugging of the high permeability zones by cements and solid slurries has also been attempted with varying degrees of success but here, the most serious drawback is the possibility of permanently closing still productive horizons.

From these early experiences, the desirability or designing a viscous slug capable of sealing off the most permeable layers, of slowly moving from injector to producer, and of diverting the trailing floodwater to the underswept, tighter regions of the reservoir, became evident. This led to the use of oil/water emulsions, gels and polymers for controlling the permeability of the formations in a process frequently referred to a "profile control", a reference to control of the vertical permeability profile of the reservoir. Profile control agents which have been proposed have included oil/water emulsions, gels, e.g. lignosulfate gels and polymers, with polymers being the most extensively applied in recent years.

Among the polymers so far examined for improving waterflood conformance are polyacrylamides (note J. C. Mack, "Process Technology Improves Oil Recovery," SPE 7179, *SPE Rocky Mountain Regional Meeting*, May 17-19, 1978, Cody, Wyo.; W. G. Routson, M. Neale, and J. R. Penton, "A New Blocking Agent for Water Channeling," SPE 3992, 47th Ann. Fall Meeting of SPE-*AIMR*, Oct. 8-11, 1972, San Antonio; D. Sparlin, "An Evaluation of Polyacrylamides for Reducing Water Production," *J. Pet. Tech.*, 906-914, August, 1976; and G. P. Willhite and D. S. Jordan, "Alteration of Permeability in Porous Rocks with Gelled Polymers," 1981 *ACS Meeting*, Aug. 23-28, New York, Polymers Preprints), polysaccharides, carboxymethylcellulose (note R. W. Farley, J. F. Ellebracht, and R. H. Friedman, "Field Test of Self-Conforming Oil Recovery Fluid," SPE 5553, 50*th Ann. Fall Meeting of SPE-AIME*, Sept. 28—Oct. 1, 1975, Dallas), furfural-alcohol and acrylic/epoxy resins (note R. H. Knapp, M. E. Welbourn, "An Acrylic/Epoxy Emulsion Gel System for Formation Plugging: Laboratory Development and Field Testing for Steam Thief Zone Plugging," SPE 7083, *Symposium on Improved Oil Recovery*, April 16-19, 1978, Tulsa; and P. H. Hess. C. O. Clark, C. A. Haskin and T. R. Hall, "Chemical Method for Formation Plugging," *J. Pet. Tech.*, 559-564, May, 1971), and polyisocyanurate (note C. T. Presley, P. A. Argabright, R. E. Smith, and B. L. Phillips, "A New Approach to Permeability Reduction," SPE 4743, Symposium on Improved Oil Recovery, April 22-24, 1974, Tulsa). A major part of this work has been conducted with the polyacrylamides.

Polyacrylamides have been used both in their normal, noncrosslinked form as well as in the form of cross-linked metal complexes. In either form, the beneficial effects derived from these polyacrylamides seem to dissipate rapidly due to shear degradation during injection and sensitivity to reservoir brines. To overcome these problems and to achieve deeper penetration into the reservoir, dilute solutions of these polymers have sometimes been injected first and then complexed in situ. For example, in one such process, three sequential injection steps are employed: cationic polyacrylamides are injected first for strong adsorption and anchoring onto the generally anionic sites of the reservoir rock surfaces, followed by chelation with aluminum ions provided by aluminum citrate or with chromium ions generated by the in situ reduction of dichromate ions and finally, anionic polyacrylamides are injected for the formation of the desired cationic polymer-metal ion-anionic polymer complexes (J. E. Hassert, and P. D. Flemming, III, "Gelled Polymer Technology for Control of Water in Injection and Production Wells," 3*rd Conference on Tertiary Oil Recovery*, U. of Kansas, Lawrence, 1979).

Another group of polymeric thickeners which has received considerable attention for use in waterflooding is the polysaccharides, particularly those produced by the action of bacteria of the genus Xanthomonas on carbohydrates. For example, U.S. Pat. Nos. 3,757,863 and 3,383,307 disclose mobility control by the use of polysaccharides in the presence of polyvalent metal ion crosslinking agents. U.S. Pat. No. 3,810,882 discloses the possibility of using certain reducible complex metal ions as cross-linking agents for polysaccharides and U.S. Pat. Nos. 4,078,607 and 4,104,193 describe a method for improving the efficiency of waterflooding operations by a particular polysaccharide prehydration technique.

U.S. Pat. No. 3,908,760 describes a polymer waterflooding process in which a gelled, water-soluble Xanthomonas polysaccharide is injected into a stratified reservoir to form a slug, band or front of gel extending vertically across both high permeability and low permeability strata. This patent also suggests the use of complexed polysaccharides to block natural or man made fractures in formations. The use of polyvalent metal ions for cross-linking polysaccharides and other polymers including polyacrylamides which are to be used for permeability control is described in U.S. Pat. Nos. 4,009,755; 4,069,869 and 4,413,680.

One problem which has continually attended the use of polymeric mobility and profile control agents is that thickened aqueous solutions, e.g. polysaccharide solutions, may be more difficult to inject into the reservoir than less viscous solutions. Also, the shear conditions encountered during injection may degrade the polymer and reduce its effect when it enters the reservoir. To overcome the injectivity problem, U.S. Pat. No. 3,208,518 proposes the use of polymer solutions of controlled pH which undergo a delayed increase in viscosity after the solution enters the formation and the pH changes by neutralization of acidic or basic constituents in the solution by materials present in the reservoir.

In general, there are two ways to deliver polymer gels into the formation. The first method is to inject gelled polymer into the formation. This is the so-called surface gelation method. The advantage of this method is that the polymer will enter the loose zone in preference to the tight zone because of the high viscosity of gelled polymer. The other advantage is that gelation is ensured because the gel is prepared on the surface. The disadvantage of this method is that the polymer gel will probably not penetrate far enough to block a high pore volume of the designated zone at low pumping pressures and low pumping rates, especially when the pressure drop occurs rapidly within a small radius of the injection wellbore. At high pumping pressures and flow rates, there are increased risks of fracturing the reservoir and degrading the gel structure by high shear forces, as previously mentioned.

The second method is the so-called in situ gelation method, in which separate slugs of polymer, one containing an inactive crosslinker (such as dichromate) and the other activator (reducing agents such as thiourea and bisulfite), are injected sequentially into the reservoir. Gelation occurs when the two parts meet in the reservoir. With this method, shear degradation is reduced and the penetration of polymer is improved because of the lower viscosity of the ungelled polymer. However, because of its low viscosity, the uncross-linked polymer slugs can also enter the tight zone and cause its blockage which defeats the purpose of profile control. Another disadvantage of this method is that there is no guarantee that the two slugs of treatments will be placed in the same area and mixed well enough to form a strong gel.

It would therefore be desirable to devise a method for delivering the gelled polymer into the formation in a manner which ensured the formation of a strong gel when the polymer was correctly placed in a large volume of the formation and which avoids the problems associated with high injection pressures, pumping rates and shear forces.

SUMMARY OF THE INVENTION

According to the present invention, a polymer solution or dispersion is initially gelled to a limited degree on the surface by the use of a cross-linking agent which is relatively rapid in its action. A cross-linking agent with a delayed cross-linking action is also added to the solution or dispersion so as to effect complete gelation at a later time when the desired depth of penetration into the formation has been achieved. The total concentration of cross-linking agents will determine the final strength of the fully gelled polymer.

The initial light gelation increases the viscosity of the polymer solution to impart its selectivity to enter only the high permeability zones. At the same time, the polymer solution retains most of its flow property so that it can be pumped deep into the formation relatively easier than a fully gelled one. Full gelation by the delayed cross-linking agent will occur when the planned treatment depth has been achieved. Since the full gelation is not developed during the delivery period, unnecessary degradation of gel structure by shear forces is minimized.

The present invention may be used with polymers which are capable of being cross-linked by means of polyvalent metal cross-linking agents which function by forming co-ordinate bonds with donor atoms such as oxygen, nitrogen or sulfur in the polymers, to form cross linkages which contribute to the structure and strength of the final, gelled polymer. Polymers of this type include polyacrylamides and other acrylic polymers and polysaccharides. The cross-linking agents employed are polyvalent metal ions such as chromium (III) which are capable of forming two or more coordinate bonds with the donor atoms in the polymers.

The method of using the polymers comprises initially gelling the polymer to a limited extent prior to injecting the polymer solution or dispersion into the formation so that it enters the zones of higher permeability and effecting a further degree of polymer gelation after the polymer has entered the high permeability zones.

DETAILED DESCRIPTION

Method—General

In the present method, a viscous liquid comprising the partly gelled polymer is injected into the subterranean oil-bearing formation in order to block the high permeability regions of the formation selectively. The liquid which is injected is a solution or dispersion of the partly gelled polymer in water; for convenience, the liquid will subsequently be referred to as a "solution" even though, in some cases, the polymer may be present as a dispersion rather than true aqueous solution.

The polymer is injected into the formation through an injection well which extends from the surface of the earth into the formation. In addition, a production well is situated on a horizontal distance or offset from the injection so that, once the polymer has been placed in the formation to control the permeability and the flooding operation begun in the normal manner by injecting the flooding fluid, e.g. water through the injection well, recovery of the oil displaced by the flooding fluid can be made through the production well. In a full scale operation, a number of wells will be used although the principle of operation will be the same. The wells may be placed in various arrangements, e.g. in line or in an ordered pattern such as five spot or inverted five spot, seven spot or inverted seven spot, as in conventional in operations of this kind.

Polymers

The polymer which is used to produce the desired gel may be of natural or synthetic origin. Because the two-step gelation reaction which is used depends on the formation of coordinate cross-linkages with the polyvalent metal ions of the cross-linking agent, the polymer should contain ligand groups with donor atoms such as oxygen, nitrogen or sulfur which are capable of forming coordinate bonds with the metal-containing ions of the cross-linking agent. These donor atoms may be in the polymer backbone or in functional groups attached to the backbone. Such functional groups may be introduced into the polymers either by the use of appropriately substituted monomers, by grafting techniques or by reaction of a pre-formed polymer with a suitable reagent for introducing the desired functional groups. Suitable polymers include acrylic polymers, e.g. polyacrylic acid, polyacrylic acid esters, polyacrylamide, polymethacrylic acid and polymethacrylic acid esters; copolymers of unsaturated carboxylic acids such as acrylic acid or methacrylic acid with olefins such as ethylene, propylene and butylene; vinyl polymers such as polyvinyl acetate and polyvinyl alcohol; polymers of unsaturated dibasic acids and anhydrides such as maleic anhydride; and their copolymers with other monomers such as ethylene, propylene, styrene and methylstyrene. Other exemplary polymers are described in U.S. Pat. No. 3,208,518 to which reference is made for a description of these polymers. The preferred polymers of this type, however, are the polyacrylamides and partly hydrolyzed polyacrylamides; they are commercially available in appropriate molecular weights from a number of suppliers such as the "Dowpusher" polyacrylamides from Dow Chemical Company and the polymers available from other suppliers including Calgon Corporation, Nalco Chemical Company and American Cyanamid.

The water soluble polyacrylamides and partially hydrolyzed polyacrylamides typically have molecular weights in the range of above $0.2 \times 10^6$, preferably from $0.5 \times 10^6$ to $40 \times 10^6$, and more preferably from $3 \times 10^6$ to $10 \times 10^6$. Other polymers will have molecular weights broadly comparable to these. The hydrolyzed polyacrylamides normally have up to about 70 percent of the carboxamide groups originally present in the polyacrylamide hydrolyzed to carboxyl groups. Preferably 1 to 30 percent of the carboxamide groups are hydrolyzed to carboxyl groups. Hydrolysis of the acrylamide polymer is accomplished by reacting it with sufficient aqueous alkali, e.g., sodium hydroxide, to hydrolyze the desired number of amide groups present in the polymer molecule. The resulting products consist of a long hydrocarbon chain, with some carbon atoms bearing amide or carboxyl groups. Copolymerization of acrylic acid and acrylamide according to well known procedures produces acrylic acid-acrylamide copolymers with similar pendant carboxamide and carboxylate functional groups. The carboxylate groups may, in either case, be present, either in the acid form or the salt form provided that the salts are water soluble. The preferred salts are the alkali metal and ammonium salts.

Another preferred class of polymers which may be used are the ionic biopolymers, of which the polysaccharides are preferred, e.g. the alginic acid polysaccharides found in plant gums. A preferred class of polysaccharides are those produced by the action of bacteria of the genus Xanthomonas on a carbohydrate. The Xanthomonas polysaccharides, their methods of preparation, their use in various applications in the petroleum industry are well known and are described, for example, in U.S. Pat. Nos. 3,243,000; 3,305,016; 3,208,518; 3,810,882, to which reference is made for disclosures of these materials, their preparation and their use.

A particular polysaccharide which is commercially available and is preferred for use in the present invention is the ionic polysaccharide B-1459 produced by fermentation of glucose with the bacterium *Xanthomonas campestris* NRRL B-1459, U.S. Department of Agriculture. This polysaccharide is produced by culturing the bacterium *Xanthomonas campestris* in a well aerated medium having a pH of about 7 which contains commercial glucose, organic nitrogen sources, dipotassium hydrogen phosphate and appropriate trace elements. This polymer is available from the Kelco Chemical Company under trade name "Kelzan" from Pfizer under the trade name "Flocon" as well as from other commercial sources.

Other water-soluble polymers which may form gels by cross-linking with metal cations include cellulose derivatives such as the carboxyalkyl and hydroxyalkyl celluloses, e.g. as described in U.S. Pat. Nos. 4,009,755, 4,069,869 and 4,413,680, to which reference is made for a description of those polymers.

The polymer is initially dissolved or suspended in water and is then gelled in two stages preferably by the use first, of a prompt cross-linking agent and second, by a delayed cross-linking agent. The cross-linking agents of both types contain polyvalent simple or complex metal ions which are capable of forming more than one coordinate bonds with the polymer. Thus, the cross-linking agent will normally be derived from aluminum, zirconium or an element of the first series of transition elements (Sc to Zn), e.g. titanium, nickel or cobalt. Because certain metals form complexes with only certain types of ligands it may be necessary to select the metal of the cross-linking agent according to the type of polymer which is being used. For example, titanium will coordinate favorably with hydroxyl ligands and because of this, these metals should be used only with polymers containing donor oxygens in the form of pendant hydroxyl groups, e.g. as in polyvinyl alcohol. The preferred cross-linking agents are those which form a Cr (III)-containing ion since simple and complex ions of Cr (III) will form effective coordination bonds with a variety of donor atoms in different chemical environments; they may therefore be used to cross-link a wide variety of different polymers. The cross-linking agent is used, as described below, to cause a programmed gelation of the polymer: in the first stage, a rapid but partial cross-linking is caused by a rapid cross-linking agent in a concentration, relative to the polymer, which effects a partial gelation. Subsequently, in a second stage, the cross-linking is carried out a stage further, to provide a firmer gel which will effectively block the high permeability zones in the formation. Thus, the form in which the cross-linking agent is reached with the polymer depends upon whether it is to be used as a rapid or a delayed, cross-linking agent.

The rapid cross-linking agents can generally be considered as those which would, if present in a sufficient concentration, gel the polymer completely within four hours. Delayed cross-linking agents, by contrast, will be those which would gel the polymer completely over a period of time longer than four hours but normally, will take a few days or even longer, to do this. The period of time which the cross-linking agent requires to effect gelation is not, however, critical because the objective underlying the use of the two different agents is to permit the introduction of a partly gelled polymer into the formation and, subsequently, to complete gelation after the polymer is in place in the formation, to form a firm, cross-linked gel which will effectively plug the high permeability zones. It would therefore be possible to employ a delayed cross-linking agent to cause the initial gelation but because this would cause an inordinate delay in the progress of the work, it will normally not be employed. Generally, the rapid cross-linking agents with a gelation time of not more than four hours will cause sufficient gelling to permit the partly gelled solution to be injected within a conveniently short period of time after cross-linking has been initiated by mixing the polymer with the cross-linking agent. Because the effect of the rapid cross-linking agent is complete within a reasonably short period of time, it is possible to wait until this partial gelation is complete, to ensure that the solution which is injected has the optimum properties, e.g. viscosity, shear stability, for injection. If a cross-linking agent with a longer gelation time were initially used, the gelation would continue over an extended period of time so that if any undue delays in the injection of the slug occurred, the portions of the solution which would be injected later would be more highly gelled than the initial portions and so the injection process might not be performed under optimum conditions.

The rate of cross-linking may be controlled by the concentration of the cross-linking agent. If a rapid cross-linking agent is used in a low concentration, a limited degree of cross-linking will take place and the gel time may be extended; however, the final gel strength will be lower unless additional cross-linking is carried out by the use of more cross-linking agent of one type or another. If a gelling agent produces a rapid gelling effect when used in relatively large amounts, it may be possible to use a lesser amount so that a relatively slow partial gelation occurs to permit the solution to be injected into the formation. The use of a delayed gelling agent may nonetheless be necessary in order to develop the final desired gel strength.

Rapid Cross-Linking Agents

Rapid cross-linking agents may be formed by combining a chromic (Cr III) salt with an alkali, at equivalent ratios of alkali:Cr (III) of up to 3:1, preferably from 0.33:1 to 2:1. The rate of the gelation reaction decreases at the lower alkali:Cr (III) ratios and it is therefore desirable to work at the higher ratios if the fastest gelling is to be achieved. The reaction of the alkali with the chromic salt is believed to produce a polymeric chromium species—a hydrolyzed Cr (III) species—which is very reactive in the cross-linking reaction. However, at equivalent ratios of alkali:Cr (III) above 3:1, aggregates of polymeric chromium oxides are believed to form and these are less reactive towards cross-linking than the species formed at lower ratios.

The chromic salt used for reaction with the alkali may be any Cr (III) salt of strong acids having good water solubility, such as $CrCl_3$, $Cr(NO_3)_3$, $Cr_2(SO_4)_3$, $Cr(ClO_4)_3$. Because the reaction with the base is one which proceeds by extraction of protons from the Cr (III) aquo complexes which exist under acidic pH conditions, any water soluble base which will increase the pH of the solution to the requisite level will be satisfactory. Inorganic bases such as NaOH, KOH, $NH_4OH$, $Na_2CO_3$, $K_2CO_3$ or organic bases which are soluble to a reasonable degree in water such as the alkoxides, alkylamines and quaternary ammonium compounds, may all be used. Generally, inorganic strong bases such as NaOH will be preferred.

When the polymer is to be gelled in this way, the reagent may be prepared separately and then added to the polymer solution or, alternatively, solutions of the chromium salt and the alkali may be added separately in the requisite proportions to the polymer to generate the reactive chromium species in situ. It has been found that when the chromium salt and the alkali are added separately to the polymer, especially when the chromium salt solution is first added to the polymer followed by the base, the gel time will be somewhat slower, usually two or more hours. It is believed that this may be due to complexing of the chromium by the polymer (without the formation of cross-linkages) in a way which initially renders the chromium less readily available for reaction with the base to form the hydrolyzed species which are more highly reactive towards cross-linking.

Rapid cross-linking agents may also be generated in situ by use of a redox reaction in which chromium in a higher oxidation state is reduced by means of a reducing agent. In such cases, the chromium will generally be in the six or seven oxidation states, in the form of anionic species such as chromate, $(CrO_4)^{2-}$, or dichromate, $(Cr_2O_7)^{2-}$. The reducing agent may be an inorganic salt such as a thiosulfite or bisulfite salt or an organic compound such as thiourea, ascorbic acid, glucose or citric acid. The relative proportions of the chromium compound and the reducing agent will be chosen to provide the desired amount of chromium for cross-linking purposes to the polymer, as indicated by the stoichiometry of the redox reaction.

In its hgher oxidation states, specifically Cr (VI) and Cr (VII), chromium is inactive as a cross-linking agent for the polymers; however, upon reduction to Cr (III) by an appropriate reducing agent, extremely reactive species are formed under certain conditions. It has been found that when the ratio of the number of protons to the number of chromate or dichromate anions is from 1:1 to 3:1, a species which is very reactive for cross-linking is produced. If the number of protons relative to the chromium compound is less than 1:1 or greater than 4:1, delayed cross-linking agents are generated. It is believed that this may be attributed in part to the speeds of the redox reactions under conditions of different acidity and in part to the nature of the Cr (III) species formed in the reaction. Under neutral conditions, it is believed that a highly hydrolyzed species similar to that produced with large amounts of alkali and Cr (III) salts is obtained. This species is, as mentioned above, relatively ineffective for cross-linking and is, therefore, considered as a delayed cross-linkage agent. Under strongly acidic conditions, the blue-colored hexaquo Cr (III) ion is produced and this too is effective only as a delayed cross-linking agent until it is hydrolyzed to form more active olated species. At intermediate values of pH, the product which is formed is believed to be a moderately hydrolyzed species which is an extremely fast cross-linking agent. Under certain conditions, the redox system itself may release sufficient protons to promote rapid reduction of the Cr (VI) or Cr (VII) species to products with a rapid cross-linking effect. For example, if thiosulfite is used as the reducing agent in moderate excess, the gelation rate is very fast whereas at lower or higher ratios of thiosulfite, the gelation rate is slow. Specifically, in the reaction:

$$2Cr_2O_7{}^{2-} + n(3S_2O_5)^{2-} + H_2O + polymer = Gel$$

when n is about 1 or less gelation is slow and the orange color of the dichromate ion persists for weeks, indicating that little or no reduction of the chromium is taking place. By contrast, when n is about 4 or more, the characteristic blue color the hexaquo Cr (III) ion develops instantly and relatively slow gelation follows as this ion is slowly hydrolyzed to the more reactive olated Cr (III) species. When a moderate excess of thiosulfite is used (n is about 2 to 3), the green color of olated Cr (III) develops in minutes, followed by rapid gelation of the polymer. The thiosulfite is functioning, it is believed, as a latent acid, releasing protons upon hydrolysis and at proper proton concentrations, rapid reduction of the chromium from its higher oxidation states takes place rapidly to form species which are highly reactive for polymer cross-linking.

Delayed Cross-Linking Agents

Because, as mentioned above, the hexaquo Cr (III) species is relatively ineffective as a cross-linking agent but is slowly converted to more effective olated species by hydrolysis, simple chromium salts which produce the Cr (III) ion in aqueous solution are delayed cross-linking agents. On being dissolved in water, the hexaquo complex $Cr(OH)_6^{3-}$ is produced and undergoes gradual hydrolysis over a period of about 2 to 4 days at room temperature to produce the reactive olated species which then participates in a rapid cross-linking reaction with the polymer. Simple chromic salts which may be used in this way include $CrCl_3, Cr(NO_3)_3, Cr_2(SO_4)_3$ and their hydrates. They have a gel time which corresponds to the rate of hydrolysis, about 2 to 4 days at room temperature.

Other methods of producing a delayed gelation may also be used. These, in general, are based on systems which produce either the hexaquo Cr (III) complex ion in solution which then undergoes slow hydrolysis to form more reactive species or the more highly hydrolyzed species which are relatively less active for cross-linking. A system of the first kind is exemplified by the redox reduction of chromium from its higher oxidation states under conditions of low pH, e.g. when the redox reaction is carried out at a proton:chromium compound ratio of about 5:1 or higher. As mentioned above, this produces the hexaquo Cr (III) ion in solution which hydrolyzes over a period of about 2-4 days to gel the polymer in the same period of time. The systems of the second kind, which are believed to form the highly hydrolyzed species have a greatly extended gel time of about 2 to 3 weeks under ambient conditions. They are exemplified by the reaction products obtained from alkalies and chromic salts at equivalent ratios of at least about 3:1 (alkali:chromic salt), and by the chromium reduction redox systems operating under neutral or basic conditions or at proton:chromium compound ratios of less than about 1:1. As mentioned above, the reduction of chromium from its higher oxidation states under these conditions is believed to result in the gradual formation of highly hydrolyzed species of low reactivity towards cross-linking.

Other chromium species with an extended delayed gel time of about 2 to 3 weeks are the Cr (III) hydrosols which may be prepared, for example, by heating a Cr (III) salt at 60°-90° for about 2 to 4 days in the presence of sulfate ion, $(SO_4)^{2-}$.

Operation

As described above, the purpose of the initial, partial gelation is to give the polymer sufficient viscosity to prevent it entering the more permeable regions of the formation but, at the same time, to keep the viscosity low enough that high injection rates and pressures are unnecessary and to permit the polymer to be injected deeply into the formation so that a large volume of the more highly permeable regions are plugged. The degree of gelation at this stage should therefore be controlled so as to meet these objectives. Because this will depend upon the permeabilities which are encountered in the formation and the extent to which the more permeable portions are to be selectively plugged, the extent of gelation will be selected by empirical means and controlled by the amount of cross-linking agent used. Because a further degree of gelation is to take place once the polymer is in place in the formation, the amount of cross-linking agent used at this stage (relative to the polymer) should not be so great as to be capable of taking up all the available cross-linking sites on the polymer. The total amount of polymer used will, of course, depend on the volume of formation which is to be treated and will itself be determined by empirical means. The viscosity and size of the slug to be selected for field application depend, of course, on reservoir and fluid properties, the degree of stratification, the extent of multi-zonal injection and commingled production, variation and symmetry of well spacing, and oil/water mobility ratio. Because the final strength of the polymer gel is determined by the total amount of cross-linking, the final gel strength will be dependent upon the nature of the polymer and the number of cross-linking sites available and the amount of cross-linking agents used, up to the amount necessary to bring about complete cross-linking. Thus, in general, the final gel strength of a given polymer may be determined by the total amount of cross-linking agent used, relative to the total amount of polymer. Higher gel strengths permit higher flooding pressures to be used without risk of polymer disintegration.

Because of the number of empirical factors, it is not possible to indicate the exact amounts of polymer and cross-linking agent which will be used in all applications at all times. However, as a general guide, the amount of the preferred Xanthomonas polysaccharides will be from 1000 to 4000 ppm in the solution, preferably 1500 to 3000 ppm, with the total amount of cross-linking agent adjusted to provide complete cross-linking of the polymer. For the preferred chromium cross-linking agents, this will generally be from 10 to 200 ppm, preferably 10 to 150 ppm, of Cr (III) as Cr metal with the Xanthomonas polysaccharides. In general, the amount of viscous liquid which may be injected into the stratified formation may be, e.g., from about 10% to about 100% of the pore volume of the high permeability stratum or strata.

The partly cross-linked solution which is injected into the stratified formation, is capable of undergoing a reversible shear-thinning effect and this property is exploited in the placement of the slug, aided by the pressure gradient around the injections wells. Around an injector, the flow rate and the associated pressure gradient are at a maximum; they drop off rapidly with radial distance from the wellbore. Thus, as the injected polymer solution flows outward, its apparent viscosity will be initially low and hence the slug can be readily injected. At a location sufficiently far away, say, 10 m., the flow rate and pressure gradient are much reduced and the viscosity returns to its low-shear high value. This increased viscosity arrests, and in some instances, stops altogether the movement of the slug. The delayed gelling effect then takes place, to form a final polymer gel of improved strength.

The complexing of the polymers also results in increased particle size, thereby minimizing the penetration of the polymer aggregates into the tighter reservoir layers. The combination of these factors and the shear-thinning effects provide a selective placement of viscous slugs into the thief zones.

The injected fluid will be proportioned into the various reservoir strata according to their effective permeabilities and flow capacities. The blocking of the most permeable flow channels leads to the diversion of the following floodwater to the under-swept portions of the reservoir and, in turn, to improved oil recovery.

The following Examples in which all parts, proportions and percentages are by weight unless the contrary is stated, illustrate the effect of the programmed gelation process.

EXAMPLES 1-7

These Examples illustrate the effect of different chromium-containing cross-linking agents on a commercially available Xanthomonas polysaccharide (Pfizer Flocon 4800-trademark). In all cases, a polymer solution containing 1000 ppm of the polysaccharide in 2% NcCl containing formaldehyde as a biocide was used. The $Cr(OH)^{2+}$ was prepared by reacting $Cr(NO_3)_3$ with Na OH at a 1:1 molar ratio. The Cr hydrosol was prepared by heating 0.0088M solution of $Cr(NO_3)_3$ and 0.0132M $K_2SO_4$ at 80° C. for two days. In each case, the specified cross-linking agent or agents was added as the pre-formed material to the polymer solution; the amount of cross-linking agent is expressed as the amount of Cr as metal.

In Example 1, no cross-linking agent was used (blank).

Examples 2 and 3 illustrate the effect of a rapid cross-linking agent, $Cr(OH)^{2+}$. At 90 ppm of the cross-linking agent as Cr metal, gelling took place within 5 minutes (Ex. 2); at 9 ppm the same polymer gelled at 5 days to produce at soft, bulk gel.

Example 4 employed a delayed cross-linker comprising Cr hydrosol. The viscosity remained low at the beginning but the polymer gelled finally in 21 days.

Example 5 employed chromic nitrate as a delayed gelling agent, with a gel time of 5 days.

Example 6 employed a combination of 9 ppm of $Cr(OH)_{2+}$ as a rapid gelling agent and 81 ppm of Cr hydrosol (as Cr) as a delayed gelling agent. A noticeable viscosity increase was detected at 6 hours and 24 hours indicating the potential for selective placement of the dual cross-linker system in formations, with final gelling taking place after placement.

Example 7 employed a combination of 9 ppm $Cr(OH)^{2+}$ as a rapid gelling agent and 81 ppm of $Cr(NO_3)_3$ as a delayed cross-linker. A slightly earlier gel time was obtained than with the Cr hydrosol (Ex. 6) and with a more pronounced initial viscosity.

The results are summarized in Table 1 below.

TABLE 1

| Example Number | Programmed Gelation of Biopolymer | | | | | |
|---|---|---|---|---|---|---|
| | Cr Composition, ppm | | | Gel Time (days) | Viscosity, mPa S | |
| | $Cr(OH)^{2+}$ | $Cr(NO_3)_3$ | Cr Hydrosol | | 6 hr | 24 hr |
| 1 | 0 | 0 | 0 | — | 18 | — |
| 2 | 90 | 0 | 0 | 5 min | — | — |
| 3 | 9 | 0 | 0 | 5 | — | 19 |
| 4 | 0 | 0 | 81 | 21 | — | 17 |
| 5 | 0 | 81 | 0 | 5 | — | 18 |
| 6 | 9 | 0 | 81 | 4 | 22 | 82 |
| 7 | 9 | 81 | 0 | 3 | 49 | 99 |

EXAMPLES 8-14

The procedure of Examples 1-7 was repeated, using the same cross-linking agents in the same amounts, but with a polyacrylamide (Cyanamide 905 N) at 2000 ppm polymer in 2% NaCl solution. The results are given in Table 2 below.

TABLE 2

| Example Number | Programmed Gelation of Polyacrylamide | | | | |
|---|---|---|---|---|---|
| | Cr Composition, ppm | | | Gel Time (days) | Viscosity, mPa S 24 hr |
| | $Cr(OH)^{2+}$ | $Cr(NO_3)_3$ | Cr Hydrosol | | |
| 8 | 0 | 0 | 0 | — | 12 |
| 9 | 90 | 0 | 0 | 10 min | — |
| 10 | 9 | 0 | 0 | 1-2 | 16 |
| 11 | 0 | 0 | 81 | 21 | 11 |
| 12 | 0 | 81 | 0 | 21 | 11 |
| 13 | 9 | 0 | 81 | 4 | 12 |
| 14 | 9 | 81 | 0 | 5 | 14 |

EXAMPLE 15

This Example illustrates the difference in gelation time that results from (i) varying ratios of alkali and chromic salt solution and (ii) the use of pre-prepared reagent as compared to in situ generation using the same materials in the same ratios.

The same xanthan polymer used in Examples 1-7 (Pfizer Flocon 4800, 2000 ppm in 2% NaCl aqueous solution) was reacted with a total 90 ppm Cr (III) cross-linker, as Cr, prepared by the reaction of $Cr(NO_3)_3$ and NaOH at equivalent ratios of 2:3, 1:1 and 2:1, both with pre-prepared reagent and with the components added separately to the polymer solution. The results are shown in Table 3 below.

TABLE 3

| | Cr Gelation of Biopolymer | |
|---|---|---|
| NaOH:Cr | Pre-prepared Reagent | In-situ Reagent |
| 2:3 | 5 min | 4 hr |
| 1:1 | 2 min | 1 hr |
| 2:1 | Instant | 5 min |

The above results show that rapid gelling is obtained at these ratios of alkali to chromic compound but that slightly more extended gelation times may be obtained by in situ generation of the cross-linking chromium species.

I claim:

1. A method for the programmed gelation of a polymer which is cross-linkable by reaction with a polyvalent metal ion, which comprises:
   (i) forming a mixture comprising the polymer, a rapid cross-linking agent and a delayed cross-linking agent,
   (ii) partly gelling the polymer by reacting the polymer with the rapid cross-linking agent which is effective to complete the partial gelation by cross-linking the polymer within four hours,
   (iii) further gelling the polymer by reacting the polymer with the delayed cross-linking agent which is effective to complete the further gelation by cross-linking the polymer over a period of time longer than four hours.

2. A method according to claim 1 in which the polymer includes functional groups capable of coordinating with the polyvalent metal ions.

3. A method according to claim 2 in which the polymer comprises a polyacrylamide or a partly hydrolyzed polyacrylamide.

4. A method according to claim 2 in which the polymer is a polysaccharide.

5. A method according to claim 1 in which the polyvalent metal is chromium (III).

6. A method for introducing a polymeric gel into a subterranean formation which comprises:
   (i) reacting a solution of a cross-linkable polymer with a rapid cross-linking agent to cross-link the polymer partly and gel the polymer partly to form a viscous liquid,
   (ii) injecting the viscous liquid, additionally containing a delayed cross-linking agent, into the formation,
   (iii) cross-linking the polymer further within the formation by reaction with the delayed cross-linking agent to form a polymer gel within the formation.

7. A method according to claim 6 in which the polymer includes functional groups capable of forming cross-linkages by coordination with polyvalent metal ions.

8. A method according to claim 7 in which the polymer comprises a polyacrylamide or a partly hydrolyzed polyacrylamide.

9. A method according to claim 7 in which the polymer comprises a polysaccharide.

10. A method according to claim 7 in which the rapid and cross-linking agent comprises compounds of a polyvalent metal selected from aluminum, zirconium or a metal of the first series of transition metals.

11. A method according to claim 6 in which the rapid cross-linking agent is produced by the reaction of an alkali with a salt of chromium (III) at an equivalent ratio of up to 3:1 (alkali:Cr (III) salt).

12. A method according to claim 6 in which the rapid cross-linking agent is produced by the reduction of a chromium compound containing chromium (VI) or chromium (VIII).

13. A method according to claim 12 in which the rapid cross-linking agent is produced by the reduction of a dichromate salt in acidic solution at a proton:dichromate molar ratio of from 1:1 to 3:1 (proton:dichromate).

14. A method according to claim 6 in which the delayed cross-linking agent comprises a salt of chromium (III).

15. A method according to claim 6 in which the delayed cross-linking agent is produced by the reduction of a dichromate salt in an acidic solution at a proton:dichromate molar ratio of less than 1:1 or greater than 3:1 (proton:dichromate).

16. A method according to claim 6 in which the delayed cross-linking agent is produced by the reduction of a dichromate salt in a neutral or basic solution.

17. A method according to claim 6 in which the delayed cross-linking agent is produced by the reaction of an alkali with a salt of chromium (III) at an equivalent ratio of at least 3:1 (alkali:Cr (III) salt).

18. A method according to claim 6 in which the delayed cross-linking agent comprises a chromium (III) hydrosol.

19. A method according to claim 18 in which the chromium (III) hydrosol is prepared by heating a solution of a Cr (III) salt in the presence of $SO_4^{2-}$.

20. In a method for the enhanced recovery of oil by a flooding technique in which a fluid is injected into a stratified subterranean, oil bearing formation through an injection well extending from the surface of the earth to the formation to displace oil from the formation towards a production well situated at a horizontal distance from the injection well and extending from the surface of the earth into the formation, the improvement comprising controlling the movement of the flooding fluid through the formation by the selective injection of a cross-linkable polymer into the more highly permeable regions of the formation by the steps of:
   (i) reacting a solution of a cross-linkable polymer with a rapid cross-linking agent to cross-link the polymer partly and gel the polymer partly to form a viscous liquid,
   (ii) injecting the viscous liquid, additionally containing a delayed cross-linking agent, into the formation,
   (iii) cross-linking the polymer further within the formation by reaction with the delayed cross-linking agent to form a polymer gel within the formation.

21. A method according to claim 20 in which the polymer comprises a cross-linkable polymer including functional groups capable of forming cross-linkages by coordination with polyvalent metal ions.

22. A method according to claim 21 in which the polymer comprises a polyacrylamide or a partly hydrolyzed polyacrylamide.

23. A method according to claim 21 in which the polymer comprises a polysaccharide.

24. A method according to claim 20 in which the rapid and delayed cross-linking agents comprise compounds of a polyvalent metal selected from aluminum, zirconium or a metal of the first series of transition metals.

25. A method according to claim 24 in which the rapid and delayed cross-linking agents comprise compounds of Cr (III).

26. A method according to claim 25 in which the rapid cross-linking agent is produced by the reaction of an alkali with a salt of chromium (III) at an equivalent ratio of up to 3:1 (alkali:Cr (III) salt).

27. A method according to claim 25 in which the rapid cross-linking agent is produced by the reduction of a chromium compound containing chromium (VI) or chromium (VII).

28. A method according to claim 27 in which the rapid cross-linking agent is produced by the reduction of a dichromate salt in acidic solution at a proton:dichromate molar ratio of from 1:1 to 3:1 (proton:dichromate).

29. A method according to claim 25 in which the delayed cross-linking agent comprises a salt of chromium (III).

30. A method according to claim 25 in which the delayed cross-linking agent is produced by the reduction of a dichromate salt in an acidic solution at a proton:dichromate molar ratio of less than 1:1 or greater than 3:1 (proton:dichromate).

31. A method according to claim 25 in which the delayed cross-linking agent is produced by the reduction of a dichromate salt in a neutral or basic solution.

32. A method according to claim 25 in which the delayed cross-linking agent is produced by the reaction of an alkali with a salt of chromium (III) at an equivalent ratio of at least 3:1 (alkali:Cr (III) salt).

33. A method according to claim 25 in which the delayed cross-linking agent comprises a chromium (III) hydrosol.

* * * * *

UNITED STATES PATENT AND TRADEMARK OFFICE
CERTIFICATE OF CORRECTION

PATENT NO. : 4,606,407

DATED : August 19, 1986

INVENTOR(S) : Paul Shu

It is certified that error appears in the above-identified patent and that said Letters Patent is hereby corrected as shown below:

Col. 8, line 22: "hgher" should be --higher--.
Col. 11, line 65: "$Cr(OH)_2+$" should be --$Cr(OH)^{2+}$--.
Col. 12, line 4: "asa" should be --as a--

Signed and Sealed this

Thirtieth Day of December, 1986

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,606,407

DATED : August 19, 1986

INVENTOR(S) : Paul Shu

It is certified that error appears in the above-identified patent and that said Letters Patent is hereby corrected as shown below:

Column 13, line 50, delete the word "and".

Signed and Sealed this

Third Day of March, 1987

Attest:

DONALD J. QUIGG

Attesting Officer

Commissioner of Patents and Trademarks